C. W. SPICER.
UNIVERSAL JOINT.
APPLICATION FILED MAY 6, 1913.

1,095,430.

Patented May 5, 1914.

Attest:

Inventor:
Clarence W. Spicer by

Attys

UNITED STATES PATENT OFFICE.

CLARENCE W. SPICER, OF PLAINFIELD, NEW JERSEY.

UNIVERSAL JOINT.

1,095,430.  Specification of Letters Patent.  Patented May 5, 1914.

Application filed May 6, 1913. Serial No. 765,825.

*To all whom it may concern:*

Be it known that I, CLARENCE W. SPICER, a citizen of the United States of America, and a resident of Plainfield, in the county of Union and State of New Jersey, have invented certain new and useful Improvements in Universal Joints, of which the following is a specification.

My invention relates to improvements in universal joints, and particularly to improvements in joints designed more especially for communicating motion between shafts or other rotating members, the axes of which are parallel or nearly so, but are or may become somewhat out of line. The joint herein described is capable, however, of transmitting motion between rotating members, the axes of which are at slight angles to one another.

The joint embodying my present invention is particularly designed for use where a small, light, compact and inexpensive joint is required, and where the joint is required to be able to withstand considerable end thrust—in fact, to withstand such end thrust that it may have a drive fit with, and be driven on, the rotating members between which it transmits motion.

My invention consists in the novel construction of the joint, and in the novel spring arrangement hereinafter described; and generally, in the features hereinafter described and particularly pointed out in the appended claim.

The objects of my invention are to provide a joint of simple, light and inexpensive construction, having great strength in proportion to its size, and capable of resisting proportionately great end thrust, and which is capable both of transmitting power between rotating members the axes of which are out of line, and of transmitting power between rotating members the axes of which are at a slight angle to each other; also, to provide as a part of the joint, an improved and simplified spring drive construction.

Figure 1:
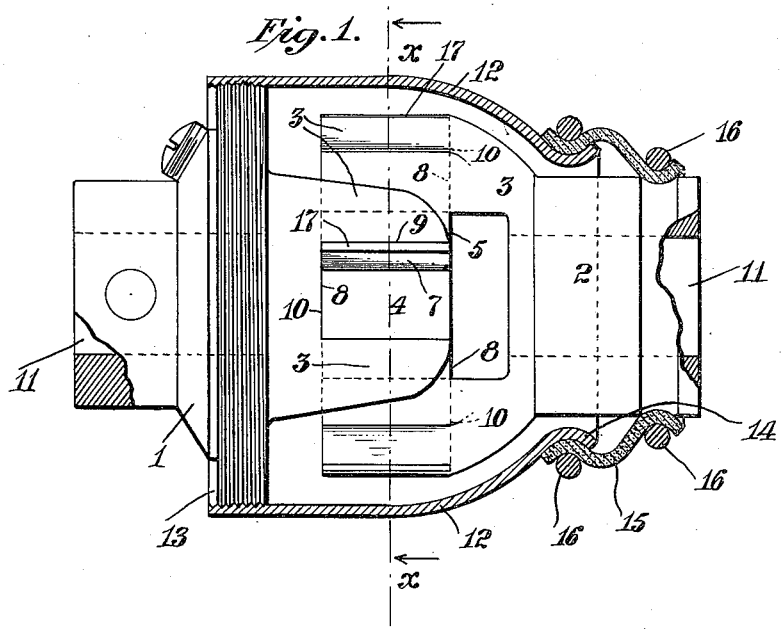
Figure 2:
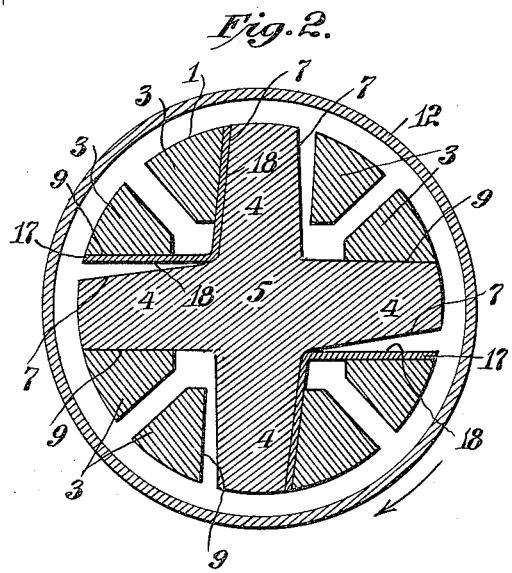

In the accompanying drawings illustrating one embodiment of my invention, Figure 1 shows a side elevation of the joint, the casing thereof being shown in longitudinal section. Fig. 2 shows a transverse section of the joint and casing on the line *x—x* of Fig. 1.

In the drawings, numeral 1 designates one of the two end members of the joint, and numeral 2 designates the other said end member; each of these end members being provided with slotted yokes 3, to receive the arms 4 of an intermediate member 5. Those faces of the arms 4 of the intermediate member which are to transmit motion have flat lateral bearing surfaces 7, and the end surfaces 8 of said arms are also flat. The bearing slots of the yokes 3 have corresponding flat lateral bearing surfaces 9 and flat end or base surfaces 10; the surfaces 7 being adapted to coact with the surfaces 9 or with the surfaces of the springs 17 hereinafter mentioned, and the surfaces 10 being adapted to coact with the surfaces 8. This construction permits the axis of member 2 to be considerably to one side of, or, in other words, out of line with, the axis of member 1; and because of the play or lost motion provided between the bearing surfaces 9 of the yokes 3, and the bearing surfaces 7 of the arms of the intermediate member, the axis of member 2 may also be at something of an angle with respect to the axis of member 1.

I have shown members 1 and 2 provided at their ends with apertures 11 (indicated by dotted lines in Fig. 1) adapted to receive the ends of shafts on which said members 1 and 2 are to be mounted; and in mounting the members 1 and 2 of the joint on said shafts, such shafts may be driven into these recesses 11, since, owing to the rectangular surfaces 8 and 10 of members 1 and 2, and of the intermediate member 4, and owing to the relatively massive construction of members 1, 2 and 5, the joint is amply able to stand the shocks incident to its being driven upon said shafts, without injury.

For inclosing the joint I have indicated a casing member 12 screwing at one end upon a flange 13 provided on member 1, the other end of said casing member being of reduced diameter and grooved as indicated at 14, a so-called "boot" 15 of leather or other suitable flexible material being secured to this reduced end 14, and to the member 2, by means of suitable clamping rings 16. Owing to the flexibility of this boot 15 it will accommodate itself as required when members 1 and 2 are out of line and are at an angle to one another.

It is desirable, in the case of joints used for driving magnetos and generators of automobile engines and the like, that there shall be some slight resilience in the drive, so that the magneto or generator may not be affected by shocks due to the explosive impulses of the engine. At the same time an ordinary spring drive is not practicable in the case of an ignition magneto, because the magneto must not lag more than a very small amount, otherwise ignition will not be properly timed. In the construction shown in Figs. 1 and 2 the arms 4 of the intermediate member 5 are slightly tapered, as shown, and one or more bent flat springs 17 are provided between one or more of the arms of member 5 and the adjacent surfaces of said yokes. In Fig. 2 the parts are shown in the position of rest, and on the assumption that member 1 is the driving member, and that rotation is in the direction indicated by the arrow, it will be clear that as member 1 starts to rotate in the direction of the arrow, the springs 17 will be bent until, if the driving torque be sufficient, surfaces 7 of the intermediate member 5 bear against surfaces 18 of the springs 17 and so in effect, against the adjacent surfaces 9 of yokes 3.

What I claim is:—

A universally-jointed power-transmitting member comprising in combination driving and driven members each having a slotted yoke, the axis of the slot of one such yoke being approximately at right angles to the axis of the slot of the other yoke, an intermediate member between said driving and driven members and having projections located within the slots of said yokes, clearance being provided between said projections and the sides of said yokes, and an angle spring located in the angle between two adjacent projections of said intermediate member, and in the corresponding yoke-slots in which such projections work, whereby motion is transmitted from the driving member to the driven member through said spring until said spring is distended sufficiently to bring the intermediate member into action.

In testimony whereof I have signed this specification in the presence of two subscribing witnesses.

CLARENCE W. SPICER.

Wtinesses:
JOHN LEE,
ROLAND M. DAVIS.